US006503975B1

(12) United States Patent
Huybrechts

(10) Patent No.: US 6,503,975 B1
(45) Date of Patent: Jan. 7, 2003

(54) SURFACTANT FREE AQUEOUS EMULSIONS

(75) Inventor: Josef Huybrechts, Oud-Turnhout (BE)

(73) Assignee: E. I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/538,104

(22) Filed: Mar. 29, 2000

(51) Int. Cl.$^7$ ................................................. C08K 3/20
(52) U.S. Cl. ..................... 524/501; 524/504; 524/505; 524/507; 524/801; 524/804; 524/819; 524/832
(58) Field of Search ................................ 524/501, 504, 524/505, 507, 801, 804, 819, 832

(56) References Cited

U.S. PATENT DOCUMENTS

| | | | |
|---|---|---|---|
| 4,508,880 A | 4/1985 | Webster | 526/190 |
| 4,680,352 A | 7/1987 | Janowicz et al. | 526/147 |
| 4,694,054 A | 9/1987 | Janowicz | 526/93 |
| 4,722,984 A | 2/1988 | Janowicz | 526/123 |
| 5,231,131 A | 7/1993 | Chu et al. | 524/504 |
| 5,362,826 A | 11/1994 | Berge et al. | 526/194 |
| 5,371,151 A | 12/1994 | Berge et al. | 525/377 |
| 5,460,892 A | 10/1995 | Bederke et al. | |
| 5,688,493 A | * 11/1997 | Sugawara | 424/61 |
| 5,763,548 A | 6/1998 | Matyjaszewski et al. | |
| 5,770,646 A | 6/1998 | Antonelli et al. | |
| 5,773,505 A | 6/1998 | Pennewiss et al. | |
| 5,844,039 A | * 12/1998 | Scranton | 524/530 |
| 5,936,026 A | 8/1999 | Huybrechts et al. | 524/504 |

FOREIGN PATENT DOCUMENTS

| | | |
|---|---|---|
| WO | WO95/19999 | 7/1995 |
| WO | WO 9532229 | 11/1995 |
| WO | WO 9615158 | 5/1996 |
| WO | WO99/42505 | 8/1999 |

OTHER PUBLICATIONS

European Search Report for EP01103394 dated Oct. 29, 2001.

* cited by examiner

Primary Examiner—Edward J. Cain
(74) Attorney, Agent, or Firm—Steven C. Benjamin

(57) ABSTRACT

Emulsions are disclosed which contain (a) an aqueous carrier and (b) a polymer mixture of (1) 40–99.5% by weight of a copolymer with a weight average molecular weight of at least 3000; and (2) 0.5–60% by weight of a stabilizing copolymer dispersed in water, wherein the stabilizing copolymer comprises a structured polymer having a hydrophobic portion and a hydrophilic portion, wherein said structured polymer is selected from the group consisting of (i) polymers comprising 5–95% by weight of a hydrophilic macromonomer having at least 10% of an acid functional monomer and 5–95% by weight of at least one hydrophobic monomer polymerized in the presence of the macromonomer; and (ii) polymers comprising 5–95% by weight of a hydrophobic macromonomer and 5–95% by weight of hydrophilic copolymer comprising at least 10% of an acid functional monomer polymerized in the presence of the macromonomer.

12 Claims, No Drawings

SURFACTANT FREE AQUEOUS EMULSIONS

BACKGROUND OF THE INVENTION

This invention relates to aqueous copolymer compositions and in particular to self-stabilized aqueous copolymer emulsions. The aqueous copolymer compositions are stabilized by block and/or graft copolymers derived from the copolymerization of a water soluble or dispersible macromonomer with a monomer or blend which is water insoluble.

Conventional emulsion copolymerization is a process in which a copolymer is formed directly in water using surfactants (i.e., compounds which are able to form micelles in the aqueous phase), which stabilize the copolymer particles in the emulsion. Surfactants may be non-ionic (e.g., alkyl or alkylphenol ethoxylated derivatives); anionic (e.g., salts of alkyl sulfates, phosphates or sulfonates); or cationic (e.g., quaternary ammonium salts of alkyl amines). Using such surfactants, which remain in the free form as a water soluble species in the emulsion, can cause problems when the emulsions are used as coating compositions, such as poor humidity and corrosion performance. It would therefore be an advantage if such copolymer emulsions could be prepared without the use of the monomeric, water sensitive surfactants.

U.S. Pat. No. 5,936,026 is directed to surfactant-free emulsions and coating compositions containing same. The emulsion is prepared by emulsion copolymerization of a monomer blend in the presence of a water soluble or water dispersible macromonomer with at least 10% of unsaturated monomers all having acid or all having amine groups in an ionized form. At least 2% and preferably 10–40% of macromonomer is needed to prepare stable emulsions, based on the overall ionized acid or amine content in the macromonomer. Such copolymer emulsions do still have a high overall level of water sensitive groups. The macromonomers do not form micelles like conventional surfactants, which is why the higher levels of macromonomer are needed to sufficiently stabilize the overall copolymer emulsion.

U.S. Pat. No. 5,362,826 discloses a method of preparing macromonomers from oligomers with a terminal unsaturated end-group. The oligomers are prepared by cobalt catalytic chain transfer polymerization as described in U.S. Pat. Nos. 4,680,352 and 4,722,984. There is no teaching in those references that the macromonomers can be used as surfactants in an emulsion copolymerization process. PCT/US95/00376 teaches aqueous branched copolymers having hydrophobic macromonomer arms and a hydrophilic backbone. These copolymers are prepared in solvent and then inverted into water. There is no teaching or suggestion that such copolymers are suitable for use in emulsion coatings.

U.S. Pat. No. 5,231,131 relates to pigment dispersions in an aqueous carrier containing a graft copolymer having a polymeric backbone which is hydrophobic in nature as compared to the side chains which are hydrophilic. The side chains consists of hydrophilic macromonomers with 20–50% of polymerized acid functional co-monomer which are neutralized with an amine or inorganic base. There is no teaching of using such graft copolymers as surfactants in an emulsion copolymerization.

SUMMARY OF THE INVENTION

An emulsion useful for forming coating compositions comprising
a) an aqueous carrier;
b) a polymer mixture comprising:
  (1) 40–99.5% by weight of a copolymer with a weight average molecular weight of at least 3000; and
  (2) 0.5–60% by weight of a stabilizing copolymer dispersed in water, said stabilizing copolymer comprising a hydrophobic portion and a hydrophilic portion, wherein said stabilizing polymer is selected from the group consisting of:
    (i) polymers comprising 5–95% by weight of a hydrophilic macromonomer having at least 10% by weight of an acid functional monomer and 5–90% by weight of at least one hydrophobic monomer polymerized in the presence of the macromonomer;
    (ii) polymers comprising 5–95% by weight of a hydrophobic macromonomer and 5–95% by weight of hydrophilic copolymer comprising at least 10% by weight of an acid functional monomer polymerized in the presence of the macromonomer.

The stabilizing copolymer can comprise a graft copolymer having a hydrophobic backbone with hydrophilic macromonomer arms, a hydrophilic backbone with hydrophobic macromonomer arms, or can comprise an AB block copolymer having a hydrophobic or hydrophilic macromonomer as the A block and a hydrophilic or hydrophobic copolymer as the B block.

The macromonomers preferably comprise the polymerization product of at least 50% by weight of monomers selected from methacrylate, methacrylonitrile, methacrylamide and derivatives and mixtures thereof with a weight average molecular weight of 500 to 10000 and prepared by cobalt catalytic chain transfer polymerization.

The process for making the emulsion and coating compositions based on the emulsion are also part of this invention.

In a most preferred embodiment, the acid value of the emulsion is less than 32.

DETAILED DESCRIPTION OF THE INVENTION

Emulsion copolymerization is a process of forming a copolymer from ethylenically unsaturated compounds directly in water. In the prior art, small amounts of surfactants were used in the process. By "surfactants" we mean organic compounds capable of forming micelles in water. These surfactants are monomer or low molecular weight derivatives which are water sensitive and can be non-ionic, anionic or cationic. Using the emulsion copolymers prepared in the presence of the surfactants in water borne coating formulations often led to problems such as poor humidity and corrosion resistance because of the presence of free surfactants which remain in the final film.

In an effort to solve these problems in the prior art, the present inventors discovered that certain structured polymers (i.e., polymers with a well defined architecture, such as AB block copolymers and graft copolymers) prepared by cobalt catalytic chain transfer polymerization act as surfactants in an emulsion copolymerization process by stabilizing the emulsion. However, unlike the surfactants used in prior art processes, the stabilizing polymers do not present disadvantages in coatings containing the emulsion and indeed can become part of the cross-linked network that forms the coating, depending on the functional groups present in the stabilizing polymer and the type of cross-linking agent used.

In the research leading up to the present invention, it was discovered that AB block copolymers prepared by the so-called Group Transfer Polymerization ("GTP") process taught in Webster, U.S. Pat. No. 4,508,880, having at least 10% content in either block, were not as effective at stabilizing the emulsions. More specifically, the present inventor found that the GTP AB block copolymers with an acid content of at least 10% in either block were not able to stabilize emulsions with high solid content (i.e., greater than 25% solids), unless relatively large amounts of the GTP polymer were used. The increased amount of the GTP polymer needed to stabilize the high solids emulsions, in turn, raised the acid value of the overall emulsion to greater than 32.

Chain transfer agents employing cobalt II or III chelates such as disclosed in U.S. Pat. Nos. 4,680,352 and 4,694,054 allow the synthesis of low molecular weight (meth)acrylate based macromonomers with a terminally ethylenically unsaturated group. The term "macromonomers" as understood in the art and used herein means a polymer terminating at one end with —C—(COOR)=CH$_2$. Low molecular weight oligomers prepared from such chain transfer agents act themselves as chain transfer agents for methacrylate monomers through an addition-fragmentation process allowing the synthesis of semi-block copolymers as disclosed in U.S. Pat. No. 5,371,151. The terminal unsaturated end group on the macromonomer can also co-polymerize with vinyl and acrylate type monomers to form a graft copolymer.

Block or graft copolymers can so be synthesized from a hydrophilic macromonomer via copolymerization of the macromonomer with hydrophobic co-monomers or from a hydrophobic macromonomer by copolymerization of the hydrophobic macromonomer with a hydrophilic monomer blend. By "hydrophilic" we mean that the monomer, macromonomer or copolymer is water soluble or water dispersible. By hydrophobic we mean that the monomer, macromonomer or copolymer is not water soluble or water dispersible. Such hydrophilic macromonomers can be prepared from methacrylate monomers in the presence of a cobalt chain transfer agent. As an example, methacrylic acid monomers polymerized in the presence of the cobalt chain transfer agent can be used to form an anionic hydrophilic macromonomer which can be neutralized with a base and inverted into an aqueous solution. Similarly, a non-ionic hydrophilic macromonomer can be prepared from polyethyleneoxide derivatives of hydroxy functional methacrylates like e.g., 2-hydroxyethyl methacrylate, 2-hydroxypropyl methacrylate and 4-hydroxybutyl methacrylate polymerized in the presence of the cobalt chain transfer agent. And, of course, cationic macromonomers can be prepared by copolymerization of amino functional methacrylates monomers like e.g., dimethylaminoethyl methacrylate, diethylaminoethyl methacrylate, and t-butylaminoethyl methacrylate with a cobalt chain transfer agent, followed by neutralization with an acid or quaternization with e.g., alkylchloride, dialkylsulfate, or dialkylcarbonate.

The hydrophilic macromonomer is typically prepared in a solvent or solvent blend, however, it can also be prepared in water or water/solvent mixture provided the formed macromonomer is soluble in the medium. The hydrophobic macromonomer is typically prepared in a solvent blend in which it is soluble. Typical solvents that can be used to form the macromonomer and further the graft or block copolymer are alcohols as e.g., methanol, ethanol, isopropanol, n-butanol, t-butanol, isobutanol, 2-butanol, 2-ethylhexylalcohol, etc.; ketones as e.g., acetone, methylethyl ketone, isobutyl methyl ketone, diactone alcohol, etc.; esters as ethyl acetate, butyl acetate, propyl acetate, isopropyl acetate, pentyl acetate, hexyl acetate, 2-ethylhexyl acetate, etc.; glycols as ethylene glycol, propylene glycol, etc.; ethers as e.g., ethylene glycol monobutyl ether, diethylene glycol mono butyl ether, etc.; aromatic solvents as e.g., toluene, xylene, Solvesso® 100 (Exxon Chemicals), Solvesso® 150 (Exxon Chemicals), Solvesso® 200 (Exxon Chemicals), etc.

To ensure that the macromonomer only has one terminal ethylenically unsaturated group to form the graft or block copolymer, the macromonomer is polymerized by using a catalytic chain transfer agent that contains cobalt II or III such as described in U.S. Pat. Nos. 4,680,352 and 4,722,984. Most preferred are pentacyanocobaltate (ii), diaquabis (borondifluorodimethyl-glyoxymato)cobaltate (ii) and diaquabis(borondifluorophenylglyoximato) cobaltate (ii). Typically these transfer agents are used at concentration of about 5 to 5000 parts per million ("ppm"), depending on the monomers used. The polymerization of the monomers in the presence of the cobalt chain transfer agent is done with initiators as peroxides and azo derivatives. Most preferred are azo initiators such as 2,2'-azobis(2-methylbutanenitrile), 4,4'-azobis(4-cyanovaleric acid) and 2-(t-butylazo)-2-cyanopropane. The peroxide initiators include peroxyesters as e.g., t-butylperoxipivalate, t-butylperoxiacetate; peroxides as e.g., dicumyl peroxide, di-tertiary butyl peroxide, di tertiary amyl peroxide; peroxicarbonates as di(n-propyl) preoxidicarbonate and peroxi salts as ammonium peroxide. Such polymerization initiators may be activated thermally, photochemically or via redox reaction.

The polymerization process can be carried out as either batch, semi-batch, continuous or feed process at the boiling point of the solvent or below at ambient or at higher pressures. The monomer blend used in the synthesis of the hydrophilic or hydrophobic macromonomer has to contain at least 50% of methacrylate, methacrylonitrile or methacrylamide monomers or derivatives thereof.

Examples of hydrophobic methacrylate monomers are methyl methacrylate, ethyl methacrylate, n-butyl methacrylate, isobutyl methacrylate, t-butyl methacrylate, 2-ethylhexyl methacrylate, lauryl methacrylate, stearyl methacrylate, cyclohexyl methacrylate, trimethylcyclohexyl methacrylate, isobornyl methacrylate, t-butylcyclohexyl methacrylate and benzyl methacrylate. Examples of hydrophilic methacrylate monomers include hydroxy functional monomers like 2-hydroxyethyl methacrylate, 2-hydroxypropyl methacrylate, 4-hydroxybutyl methacrylate as well as ethoxylated or propoxylated derivatives thereof; acid functional monomers as methacrylic acid, 2-sulfoethyl methacrylate; amino functional monomers as dimethylaminoethyl methacrylate, diethylaminoethyl methacrylate, t-butylaminoethyl methacrylate, morpholinoethyl methacrylate and quaternary ammonium salts thereof. Other functional methacrylate monomers include acetoacetoxyethyl methacrylate, furfuryl methacrylate, glycidylmethacrylate, allyl methacrylate, n-(2-methacryloxyethyl)ethyleneurea, 2-cyanoethyl methacrylate and trimethoxysilylpropyl methacrylate.

Examples of methacrylonitrile and methacrylamide type monomers include alkyl or cycloalkyl methacrylamide, n-methylol methacrylamide, methoxymethyl methacrylamide, n-butoxymethyl methacrylamide, isobutoxymethyl methacrylamide, t-butylaminopropyl methacrylamide and dimethylaminopropyl methacrylamide.

The remainder of the macromonomer composition can be prepared from other polymerizable ethylinically unsaturated monomers such as alkenes, vinyl, vinylaromatic, acrylates, acrylonitrile, acrylamide and their derivatives. Examples of alkene and vinyl derivatives include dodecene, styrene, t-butylstyrene, methylstyrene, vinylacetate, vinylpropionate, versatic acid esters of vinylalcohol and vinylsilane. Examples of hydrophobic acrylates are methyl acrylate, ethyl acrylate, n-butyl acrylate, isobutyl acrylate, t-butyl acrylate, 2-ethylhexyl acrylate, lauryl acrylate, stearyl acrylate, cyclohexyl acrylate, trimethylcyclohexyl acrylate, isobornyl acrylate, t-butylcyclohexyl acrylate, benzyl acrylate, 2-hydroxyethyl acrylate, 2-hydroxypropyl acrylate, 4-hydroxybuty acrylate as well as ethoxylated or propoxylated derivatives thereof; acid functional monomers as acrylic acid, itaconic acid; amino functional monomers as dimethylaminoethyl acrylate, diethylaminoethyl acrylate, t-butylaminoethyl acrylate, morpholinoethyl acrylate and quaternary ammonium salts thereof. Other functional acrylate monomers like furfuryl acrylate, glycidyl acrylate, allyl acrylate and trimethoxysilylpropyl acrylate, acrylonitrile and acrylamide and derivatives as alkyl or cycloalkyl acrylamide, n-methylol acrylamide, methoxymethyl acrylamide, n-butoxymethyl acrylamide, isobutoxymethyl acrylamide, t-butylaminopropyl acrylamide and dimethylaminopropyl acrylamide, and/or other unsaturated derivatives can be copolymerized as e.g., maleates, fumarates, maleic anhydride and acid, fumaric acid, etc. may also be used.

The macromonomer can be chemically modified before or after copolymerization by reaction of functional groups of the macromonomer with other chemicals. Acid functional groups on the macromonomer for example can be reacted with mono epoxy derivatives as butylene oxide, cyclohexeneoxide, Cardura® E10 (a C10 versatic acid glycidyl ester from Shell). Hydroxy functional groups can for examples be reacted with cyclic lactones as epsilon caprolactone. Epoxy functional groups can be modified with acid or amino functional derivatives.

The macromonomer is then further copolymerized with hydrophobic or hydrophilic monomers to form the structured (i.e., block or graft) stabilizing copolymer. A low molecular weight macromonomer will form a block stabilizing copolymer when mostly methacrylate based monomers are used in this step via an addition-fragmentation process. Acrylate and other vinyl monomers will form a graft copolymer through reaction of the terminally unsaturated group.

One portion of the structured stabilizing copolymer (i.e., either the backbone or arms of a graft copolymer or the A or B block of a block copolymer) must be hydrophilic, that is water soluble or water dispersible. Thus, at least 10% by weight of either the macromonomer or the copolymerizing co-monomers must be acid functional. Methacrylic acid is preferred, but other acid functional monomers, e.g., acrylic acid, itaconic acid, maleic acid, fumaric acid, 2-sulfoethyl methacrylate, acrylamido propane sulfonic acid, can be used to advantage. The acid functionality in the block or graft copolymer is typically neutralized with a base to make it water soluble or dispersible. Examples of bases are alkali metal (potassium, sodium, lithium) hydroxides, or ammonia, or amines. Preferred are amines as e.g. triethylamine, dimethylamino ethanol, 2-amino-2-methyl-1-propanol, 2-(dimethylamino)-2-methyl-1-propanol, diethanolamine and diisopropanolamine, for example.

The process of forming the graft or block copolymer from the macromonomer is comparable to the typical process of forming the macromonomer in which the macromonomer is used as a co-monomer. The neutralization of the acid groups of the block or graft copolymer is preferably done after the formation of the copolymer before the inversion into water. After the inversion step, the solvents used in the synthesis of the graft or block copolymer can be distilled off.

The stabilizing copolymer dispersion is then used in lieu of a surfactant in the formation of a copolymer emulsion. The amount of stabilizing copolymer used in the emulsion can be between 0.5–60% by weight, more preferably between 2–15% by weight and all ranges encompassed therein. Typical monomers used in the emulsion copolymerization step are the monomers used in the synthesis of the block copolymer. Preferably water soluble thermal initiators such as ammonium persulfate, potassium persulfate, or 4,4'-azo bis(4-cyano pentanoic acid) are used. Redox initiators can also be used such as e.g., t-butylhydroperoxide, cumylhydroperoxide with ascorbic acid, sodium formaldehyde sulfoxylate as reducing agent.

The surfactant free emulsions stabilized by the block or graft copolymers can be used in water borne coating compositions such as automotive primers, primer surfacers, pigmented topcoats and clear coats. Any kind of pigments used in waterborne paints such as metallic oxides like titanium dioxide, colored iron oxides, zinc oxide, talc, china clay, barium sulfate, aluminum silicates etc. and a wide variety of organic pigments such as quinacridones, phthalocyanines, perylenes, idanthrones, carbazoles and flake pigments as aluminum and pearlescent flakes may be used. The compositions can also be used in other water borne applications as inks, adhesives, cements and UV curable formulations.

The coating compositions preferably are based on (meth) acrylate—vinylaromatic copolymers. The copolymers can be high molecular weight to be used in only thermoplastic formulations or can be of lower molecular weight with functional groups present to be crosslinked. Examples of crosslinkable formulations are hydroxy functional copolymers crosslinked with etherified melamine, benzoguanamine or urea formaldehyde adducts. The etherifications in those crosslinkers is typically done with mono alcohols as methanol, isobutanol or n-butanol. The crosslinking can also be done with blocked or unblocked polyisocyanates. Examples of polyisocyanates are urethane adducts, biurets and cyclotrimers of hexamethylenediisocyanate, tetramethyl xylylenediisocyanate, toluenediisocyanate and isophoronediisocyanate. Examples of blocking groups are methylethyl ketoxime, caprolactam, alcohols, malonates and dimethyl pyrazole. The crosslinking can be performed at room temperature to higher temperatures up to 240° C. Typically the curing temperature is from ambient up to 80° C. for compositions cured with unblocked polyisocyanates while 80° C. to 180° C. is used for formaldehyde adducts or blocked polyisocyanates. If those crosslinkers are not water soluble or dispersible, the graft copolymer emulsion can act as emulsifier. The crosslinkers can also be hydrophilically modified to make them water soluble or dispersible. An example of hydrophilic modified crosslinkers are adducts of polyisocyanates with polyethylene glycol.

It may be desirable to add other optional ingredients to the paint formulations as antioxidants, flow modifiers, UV stabilizers, rheology control agents and/or other film forming binders can be added to the overall formulations such as binders derived from epoxy, phenolic, urethanes, polyester, polyamides, polyureas, polyacrylic or hybrids thereof.

EXAMPLES

The following examples illustrate the invention. All parts and percentages are on a weight basis. Molecular weights are determined by gel permeation chromatography using polystyrene as the standard and tetrahydrofuran as the carrier solvent.

Example 1

Macromonomer

A macromonomer was prepared by mixing the following constituents into a 2 liter flask equipped with a thermometer, stirrer, dropping funnels, reflux condenser and a means for maintaining a nitrogen blanket over the reactants:

| | |
|---|---|
| Part 1 | |
| isopropanol | 200 |
| Part 2 | |
| methacrylic acid | 400 |
| isopropanol | 106 |
| Part 3 | |
| methyl ethyl ketone | 209.6 |
| diaquabis(borondifluorodiphenyl-glyoximato) cobalt(ii) (co(dpg-bf2) | 0.4 |
| 2,2'-azobis(2,4-dimethylpentanenitrile) (Vazo ® 52, DuPont Co.) | 4 |
| Part 4 | |
| isopropanol | 5 |
| methyl ethyl ketone | 5 |
| Part 5 | |
| Vazo ® 52 | 0.5 |
| methyl ethyl ketone | 49.5 |
| Part 6 | |
| methyl ethyl ketone | 10 |
| Part 7 | |
| methyl ethyl ketone | 10 |

Part 1 was heated in the reactor to its reflux temperature (±82° C.) followed by the simultaneous addition of Parts 2 and 3 with a dropping funnel over a 4 hour period. Part 4 was next added to rinse the dropping funnels and the contents of the reactor was held at reflux for 15 minutes. Next was added Part 5 over a 30 minute period followed by Part 6 to rinse the funnel after which the reactor contents were held 1 hour at reflux. Finally Part 7 was added.

The macromonomer had the following properties:

| | |
|---|---|
| Solids contents (1 hour drying at 105° C.) | 36.2% |
| Gardner Holdt viscosity | Z2 |
| Number average molecular weight (MN) | 1700 |
| Weight average molecular weight (MW) | 3000 |

Examples 2–5

Block Oligomers

Following the procedure of Example 1, the following block oligomers were prepared by starting with Part 1, adding Part 2 over 4 hours, followed by a rinsing step with Part 3. After a reflux hold period of 30 minutes, Part 4 was added as a shot followed by a rinsing step with Part 5 and a hold period at reflux for 1 hour. Finally Part 6 was added.

| Examples | 2 | 3 | 4 | 5 |
|---|---|---|---|---|
| Part 1 | | | | |
| Example 1 | 1000 | 500 | 1000 | 500 |
| isopropanol | 200 | 166.6 | 200 | 166.6 |
| Part 2 | | | | |
| methyl methacrylate | | | 600 | 520 |
| n-butyl methacrylate | 600 | 520 | | |
| 2-hydroxyethyl methacrylate | | 280 | | 280 |
| 2,2'-azo bis(2,-methylpropanonitrile) (Vazo ® 64 from DuPont) | 6 | 8 | 6 | 8 |
| methyl ethyl ketone | 94 | 92 | 94 | 92 |
| Part 3 | | | | |
| methyl ethyl ketone | 20 | 20 | 20 | 20 |
| Part 4 | | | | |
| Vazo ® 64 | 10 | 10 | 10 | 10 |
| methyl ethyl ketone | 90 | 90 | 90 | 90 |
| Part 5 | | | | |
| methyl ethyl ketone | 10 | 10 | 10 | 10 |
| Part 6 | | | | |
| methyl ethyl ketone | 60 | 460 | 60 | 460 |
| Properties: | | | | |
| % Solids | 49.6 | 51 | 47.4 | 51 |
| Gardner Holdt viscosity | Z1 + ½ | X | Z4 + ½ | Z5 |
| MN | 4000 | 6800 | 4000 | 6900 |
| MW | 8000 | 11900 | 7500 | 12300 |

Examples 6–9

Copolymer Emulsions Stabilized with the Block Oligomers from Examples 2–5

Copolymer emulsion stabilized with the block oligomers from examples 2–5 were prepared by mixing the following constituents in a 2 liter flask equipped with a thermometer, stirrer, dropping funnels, reflux condenser and a means for maintaining a nitrogen blanket over the reactants:

| Examples | 6 | 7 | 8 | 9 |
|---|---|---|---|---|
| Part 1 | | | | |
| dimethylamino ethanol | 6 | 6 | 12 | 12 |
| methyl methacrylate oligomer (70% solution in methyl ethyl ketone) | 35.7 | 35.7 | 35.7 | 35.7 |
| oligomer from Example 2 | 30 | | | |
| oligomer from Example 4 | | 30 | | |
| oligomer from Example 3 | | | 120 | |
| oligomer from Example 5 | | | | 120 |
| deionized water | 274 | 274 | 268 | 268 |
| Part 2 | | | | |
| styrene | 125 | 125 | 125 | 125 |
| 2-ethylhexyl acrylate | 75 | 75 | 70 | 70 |
| 2-ethylhexyl methacrylate | 125 | 125 | 100 | 100 |
| 2-hydroxypropyl methacrylate | 120 | 120 | 105 | 105 |
| t-butylaminoethyl methacrylate | 15 | 15 | 15 | 15 |
| propyleneglycol methylether acetate | 3 | 3 | 3 | 3 |
| Part 3 | | | | |
| 4,4'-azobis (4-cyanopentanoic) acid | 8.9 | 8.9 | 8.9 | 8.9 |
| dimethylamino ethanol | 6.6 | 6.6 | 6.6 | 6.6 |
| deionized water | 170 | 170 | 170 | 170 |
| Part 4 | | | | |
| deionized water | 3 | 3 | 3 | 3 |
| propyleneglycol methylether acetate | 2 | 2 | 2 | 2 |

-continued

| Examples | 6 | 7 | 8 | 9 |
|---|---|---|---|---|
| Part 5 | | | | |
| 4,4'-azobis (4-cyanopentanoic) acid | 0.9 | 0.9 | 0.9 | 0.9 |
| dimethylamino ethanol | 0.6 | 0.6 | 0.6 | 0.6 |
| deionized water | 10 | 10 | 10 | 10 |
| Part 6 | | | | |
| deionized water | 5 | 5 | 5 | 5 |
| Part 7 | | | | |
| deionized water | 10 | 10 | 10 | 10 |

The contents of Part 1 were brought in the reactor and heated till 92° C. while the volatiles (methyl ethyl ketone-isopropanol) were distilled off. Part 2 and 3 were added simultaneously to the reactor at 92° C. over 4 hours followed by Part 4 to rinse the addition funnels and a hold period of 15 minutes. Next were added Part 5 over 30 minutes, followed by Part 6 as rinse and a hold for 1 hour. Finally part 7 was added.

| | Properties: | | | |
|---|---|---|---|---|
| Example | 6 | 7 | 8 | 9 |
| % solids | 50.8 | 51.6 | 50.4 | 50.6 |
| Brookfield viscosity (centipoise) | 9500 | 1740 | 53000 | 12000 |
| pH | 8.6 | 8.5 | 8.7 | 8.6 |
| MN | 7500 | 22600 | 15300 | 22000 |
| MW | 36200 | 45100 | 58400 | 59000 |

Example 10

Macromonomer

The procedure of example 1 was followed in making the following composition.

| Part 1 | |
|---|---|
| isopropanol | 200 |
| Part 2 | |
| methacrylic acid | 400 |
| isopropanol | 156 |
| Part 3 | |
| methyl ethyl ketone | 239.5 |
| diaquabis(borondifluorodiphenyl-glyoximato) cobalt(ii) (co(dpg-bf2)) | 0.5 |
| (Vazo ® 52 | 4 |
| Part 4 | |
| isopropanol | 5 |
| methyl ethyl ketone | 5 |
| Part 5 | |
| Vazo ® 52 | 0.3 |
| methyl ethyl ketone | 19.7 |
| Part 6 | |
| methyl ethyl ketone | 10 |
| Part 7 | |
| methyl ethyl ketone | 10 |

-continued

| Properties: | |
|---|---|
| % solids | 34.8% |
| Gardner Holdt viscosity | T |
| MN | 1750 |
| MW | 2410 |

Examples 11–13

Block Oligomers

The procedure of Examples 2–5 was followed using the ingredients below:

| Examples | 11 | 12 | 13 |
|---|---|---|---|
| Part 1 | | | |
| Example 10 | 525 | 1050 | 525 |
| isopropanol | 75 | 141.6 | 75 |
| Part 2 | | | |
| n-butyl methacrylate | 200 | 300 | 500 |
| 2-hydroxyethyl methacrylate | 580 | 280 | 280 |
| t-butylaminoethyl methacrylate | 20 | 20 | 20 |
| Vazo ® 64 | 6 | 8 | 6 |
| methyl ethyl ketone | 192 | 132 | 192 |
| Part 3 | | | |
| methyl ethyl ketone | 20 | 20 | 20 |
| Part 4 | | | |
| Vazo ® 64 | 10 | 10 | 10 |
| methyl ethyl ketone | 90 | 90 | 90 |
| Part 5 | | | |
| methyl ethyl ketone | 10 | 10 | 10 |
| Part 6 | | | |
| methyl ethyl ketone | 20 | 20 | 20 |
| Properties: | | | |
| % solids | 51.2 | 52.3 | 51.8 |
| Gardner Holdt viscosity | Z5 – ¼ | Z6 – ¼ | Z + ½ |
| MN | 5100 | 3600 | 5300 |
| MW | 7600 | 5200 | 8500 |

Examples 14–16

Copolymer Emulsions Stabilized with the Block Oligomers from Examples 11–13

The procedure of Examples 6–9 was followed in making the following compositions.

| Examples | 14 | 15 | 16 |
|---|---|---|---|
| Part 1 | | | |
| dimethylamino ethanol | 6 | 6 | 6 |
| methyl methacrylate oligomer (70% solution in methyl ethyl ketone) | 35.7 | 35.7 | 35.7 |
| oligomer from Example 11 | 300 | | |
| oligomer from Example 12 | | 300 | |
| oligomer from Example 13 | | | 300 |
| deionized water | 274 | 274 | 274 |
| Part 2 | | | |
| styrene | 125 | 125 | 125 |
| 2-ethylhexyl acrylate | 75 | 75 | 75 |
| 2-ethylhexyl methacrylate | 125 | 125 | 125 |
| 2-hydroxypropyl methacrylate | 120 | 120 | 120 |

-continued

| Examples | 14 | 15 | 16 |
|---|---|---|---|
| t-butylaminoethyl methacrylate | 15 | 15 | 15 |
| propyleneglycol methylether acetate | 3 | 3 | 3 |
| Part 3 | | | |
| 4,4'-azobis (4-cyanopentanoic) acid | 8.9 | 8.9 | 8.9 |
| dimethylamino ethanol | 6.6 | 6.6 | 6.6 |
| deionized water | 170 | 170 | 170 |
| Part 4 | | | |
| deionized water | 3 | 3 | 3 |
| propyleneglycol methylether acetate | 2 | 2 | 2 |
| Part 5 | | | |
| 4,4'-azobis (4-cyanopentanoic) acid | 0.9 | 0.9 | 0.9 |
| dimethylamino ethanol | 0.6 | 0.6 | 0.6 |
| deionized water | 10 | 10 | 10 |
| Part 6 | | | |
| deionized water | 5 | 5 | 5 |
| Part 7 | | | |
| deionized water | 10 | 10 | 10 |
| Properties: | | | |
| % solids | 49.3 | 50 | 49.1 |
| Brookfield viscosity (centipoise) | 1960 | 3950 | 6700 |
| pH | 8.4 | 8.3 | 8.6 |
| MN | 20500 | 21500 | 23000 |
| MW | 107700 | 105200 | 110800 |

Example 17

Amide Functional Copolymer Emulsion Stabilized with Block Oligomer from Example 2

The procedure of example 6–9 was followed for following composition:

| Part 1 | |
|---|---|
| Deionzed water | 331.2 |
| 2-Amino-2-methyl-1-propanol 90% in water | 13.8 |
| Oligomer from Example 2 | 60 |
| Part 2 | |
| Styrene | 100 |
| Methyl methacrylate | 42 |
| 2-Ethylhexyl acrylate | 200 |
| 2-Hydroxyethyl acrylate | 12 |
| Isopropanol | 3 |
| Part 3 | |
| 4,4'-azobis (4-cyanopentanoic) acid | 1 |
| 2-Amino-2-methyl-1-propanol 90% in water | 0.8 |
| Methacrylamide | 16 |
| Deionized water | 168.2 |
| Part 4 | |
| isopropanol | 2 |
| Deionized water | 5 |
| Part 5 | |
| 4,4'-azobis (4-cyanopentanoic) acid | 19.1 |
| 2-Amino-2-methyl-1-propanol 90% in water | 5 |
| Deionized water | 5 |
| Part 6 | |
| Deionized water | 5 |
| Part 7 | |
| Deionized water | 5 |

-continued

| Test results: | |
|---|---|
| Solids | 38.4 |
| Viscosity | 110 cps |
| pH | 6.4 |
| Molecular weight: | unknown (polymer not soluble in THF.) |

Example 18

Acetoacetoxy Functional Copolymer Emulsion Stabilized with Block Oligomer from Example 2

The procedure of example 6–9 was followed for following composition:

| Part 1 | |
|---|---|
| Deionzed water | 280.9 |
| Dimethylamino ethanol | 6 |
| Oligomer from Example 2 | 27.3 |
| Part 2 | |
| Acetoacetoxyethyl methacrylate | 110 |
| Methyl methacrylate | 185 |
| 2-Ethylhexyl acrylate | 150 |
| 2-Hydroxypropyl methacrylate | 40 |
| Propyleneglycol methylether acetate | 3 |
| Part 3 | |
| 4,4'-azobis (4-cyanopentanoic) acid | 8.9 |
| Dimethylamino ethanol | 6.6 |
| Deionized water | 170 |
| Part 4 | |
| Propyleneglycol methylether acetate | 2 |
| Deionized water | 3 |
| Part 5 | |
| 4,4'-azobis (4-cyanopentanoic) acid | 0.9 |
| 2-Amino-2-methyl-1-propanol 90% in water | 0.6 |
| Deionized water | 10 |
| Part 6 | |
| Deionized water | 5 |
| Part 7 | |
| Deionized water | 10 |
| Test results: | |
| Solids | 48.1 |
| Viscosity | 175 cps |
| pH | 7.4 |
| MN | 82000 |
| MW | 800000 |

Example 19

Water Borne Basecoat Based on Example 17

Following ingredients were mixed:

| Deionized water | 60.14 |
|---|---|
| Balab 3056a (Witco) | 0.1 |
| Emulsion from Example 17. | 32.16 |
| Dynol 604 (Air Products) | 0.15 |
| n-pentanol | 4 |
| 5% ammonia in deionized water | 1.05 |
| acrysol ase 60 (Rohm and Haas) | 2.4 |

Of this first step, the pH was 8.36 and the viscosity 368 cps. To 45.12 parts of this first step were added under stirring:

| | |
|---|---|
| Aquapaste 3141-c33 (Silberline) | 27.62 |
| Aquapaste e2585 (Silberline) | 26.2 |
| Titanium dioxide paste MT-500-HD (Tayca) | 0.46 |
| Carbon black paste Raven 1170 (Columbian Chemicals) | 0.36 |
| Paste of a transparent red b rt333d (Ciba Chemicals) | 0.24 |

The viscosity was adjusted to 2800 cps with deionized water and 15 microns of this water borne silver metallic basecoat were sprayed over a standard 2-component primer surfacer which was first sanded. A standard 2-component clear coat was applied at 50 microns film build over the basecoat and the overall system was baked 30 minutes at 60° C.

The adhesion, humidity and chip resistance were very good as well as the appearance and metallic flake control.

Comparative Example 1
Macromonomer According to U.S. Pat. No. 5,936,026 with Composition from Example 5

A macromonomer was prepared from methyl methacrylate, 2-hydroxyethyl methacrylate and methacrylic acid (52/28/20 by weight) according U.S. Pat. No. 5,936,026 using the cobalt chain transfer agent as used to prepare the methacrylic acid macromonomer in Example 1. Such a macromonomer is a random copolymer while Example 5 is a block copolymer with a ratio of methyl methacrylate/2-hydroxyethyl methacrylate (A-block)//methacrylic acid (B-block) of 52/28//20.

Comparative Example 2
Copolymer Emulsion with Composition of Example 9 Based on Comparative Example 1

The procedure of Example 9 was followed but in Part 1, the block oligomer of Example 5 was replaced with the random macromonomer of Comparative Example 1. During the step of adding Part 2 and Part 3, the emulsion phase separated and was unstable.

Comparative Example 3
Water Soluble Macromonomer with Less Than 10% by Weight of Acid The procedure of Example 1 was followed to prepare a macromonomer with a monomer weight ratio 2-hydroxyethyl methacrylate/methacrylic acid of 94/6.

| Part 1 | |
|---|---|
| methyl ethyl ketone | 9.5 |
| 2-hydroxyethyl methacrylate | 13.16 |
| methacrylic acid | 0.84 |
| co(dpg-bf2) | 0.007 |
| Part 2 | |
| methyl ethyl ketone | 18.965 |
| 2-hydroxyethyl methacrylate | 52.64 |
| methacrylic acid | 3.36 |
| co(dpg-bf2) | 0.028 |
| Vazo ® 52 | 0.5 |
| Part 3 | |
| methyl ethyl ketone | 1 |

Part 1 was heated at reflux and Part 2 was added over 4 hours followed by a rinsing step with Part 3. The reactor contents were held 1 hour at reflux.

| Properties: | |
|---|---|
| % solids | 65.6 |
| Gardner Holdt viscosity | I + ¼ |
| MN | 980 |
| MW | 1450 |

Comparative Example 4
Block Oligomer from Macromonomer Example 3

Following the procedure of Examples 11–13, a block oligomer was prepared as follows:

| Part 1 | |
|---|---|
| macromonomer from comparative example 3 | 914.3 |
| Part 2 | |
| n-butyl methacrylate | 340 |
| t-butylaminoethyl methacrylate | 20 |
| Vazo ® 64 | 2 |
| methyl ethyl ketone | 28 |
| Part 3 | |
| methyl ethyl ketone | 9 |
| Part 4 | |
| Vazo ® 64 | 1 |
| methyl ethyl ketone | 9 |
| Part 5 | |
| methyl ethyl ketone | 5 |
| Part 6 | |
| methyl ethyl ketone | 5 |
| Properties: | |
| % solids | 81.5 |
| Gardner Holdt viscosity | >Z6 |
| MN | 1530 |
| MW | 3600 |

Comparative Example 5
Copolymer Emulsion Stabilized by Block Copolymer Example 4

The procedure of Example 14 was followed, but in Part 1 block copolymer from Example 11 was replaced by block copolymer from Comparative Example 4. After 3 hours feeding of Parts 2 and 3, the emulsion phase separated in two layers. This Comparative Example shows more than 6% acid groups are needed in the hydrophilic part of the block oligomer to enable to stabilize a copolymer emulsion.

Comparative Example 6
Block Oligomer by Group Transfer Polymerization According U.S. Pat. No. 5,085,698

To a stirred solution of 34.5 grams of dimethyl ketene 2-trimethylsiloxyethyl trimethylsilylacetal and 0.3 ml of a 0.1 molar solution of tetrabutylammonium acetate in 375 grams of tetrahydrofuran was added 177.5 grams of n-butyl methacrylate (BMA). 45 minutes after the exother, a mixture of 88.8 grams n-butylmethacrylate and 199.4 grams of trimethylsilyl methacrylate was added. After 3 hours, the resulting block copolymer was refluxed for two hours with 420 grams of methanol to hydrolyze the trimethylsilyl methacrylate to methacrylic acid (MAA) after which the solvent was stripped off. The resulting AB block copolymer BMA//BMA/MAA=47.5//23.7/28.8 by weight had MN=3960 and MW=4920 and an acid value of 175.9.

Comparative Example 7
Copolymer Emulsion Stabilized by Block Copolymer from Example 6

The procedure of example 6–9 was followed for following composition:

| Part 1 | |
|---|---|
| Deionized water | 50 |
| Sodium metabisulfite | 0.25 |
| Copolymer from Comparative Example 6 (25% solution in deionized water neutralized with dimethylamino ethanol) | 3.13 |
| Part 2 | |
| n-butyl methacrylate | 160 |
| n-butyl acrylate | 20 |
| 2-hydroxypropyl methacrylate | 20 |
| ammonium persulfate | 1.5 |
| Oligomer from Comparative Example 6 (25% solution in deionized water neutralized with dimethylamino ethanol) | 15.21 |
| sodium phosphate | 2.5 |
| deionized water | 131.25 |
| Part 3 | |
| t-butylhydroperoxide | 0.61 |
| Deionized water | 5 |
| Part 4 | |
| sodium formaldehyde sulfoxylate | 0.61 |
| Deionized water | 5 |

Part 2 was added over 3 hours to part 1 which was first brought to 80° C. Part 3 was then added and the reactor contents held for 10 minutes, followed by the addition of Part 4 over 30 minutes and a hold period of 60 minutes at 80° C. The resulting latex was not stable.

What is claimed is:

1. An emulsion useful for forming coating compositions comprising:
   a) an aqueous carrier; and
   b) a polymer mixture comprising:
      (1) 40–99.5% by weight of a copolymer comprising polymer compositions not encompassed by the hereinafter defined stabilizing copolymer of part (2), with a weight average molecular weight of at least 3000; and
      (2) 0.5–60% by weight of a stabilizing copolymer dispersed in water, said stabilizing copolymer comprising a hydrophobic portion and a hydrophilic portion, wherein said stabilizing polymer is selected from the group consisting of:
         (i) polymers comprising 5–95% by weight of a hydrophilic macromonomer having at least 10% by weight of an acid functional monomer and 5–90% by weight of at least one hydrophobic monomer polymerized in the presence of the macromonomer; and
         (ii) polymers comprising 5–95% by weight of a hydrophobic macromonomer and 5–95% by weight of a hydrophilic copolymer comprising at least 10% by weight of an acid functional monomer polymerized in the presence of the macromonomer,
   wherein the macromonomer comprises at least 50% by weight of monomers selected from the group consisting of methacrylate, methacrylonitrile, methacrylamide and derivatives and mixtures thereof with a weight average molecular weight of 500 to 10000 and is prepared by cobalt catalytic chain transfer polymerization.

2. The emulsion of claim 1, wherein the stabilizing copolymer comprises an AB block copolymer having a hydrophilic macromonomer as the A block and a hydrophobic copolymer as the B block.

3. The emulsion of claim 1, wherein the stabilizing polymer comprises a graft copolymer having a hydrophobic backbone and at least one hydrophobic macromonomer attached at a terminal end to the backbone.

4. The emulsion of claim 1, wherein the stabilizing copolymer comprises 2–15% by weight of the polymer mixture.

5. The emulsion of claim 1 having an acid value of less than 32.

6. A water borne coating composition comprising an aqueous emulsion, said emulsion comprising:
   a) an aqueous carrier;
   b) a polymer mixture comprising:
      (1) 40–99.5% by weight of a copolymer with a weight average molecular weight of at least 3000; and
      (2) 0.5–60% by weight of a stabilizing copolymer dispersed in water, said stabilizing copolymer comprising a hydrophobic portion and a hydrophilic portion, wherein said stabilizing polymer is selected from the group consisting of:
         (i) polymers comprising 5–95% by weight of a hydrophilic macromonomer having at least 10% by weight of an acid functional monomer and 5–90% by weight of at least one hydrophobic monomer polymerized in the presence of the macromonomer;
         (ii) polymers comprising 5–95% by weight of a hydrophobic macromonomer and 5–95% by weight of hydrophilic copolymer comprising at least 10% by weight of an acid functional monomer polymerized in the presence of the macromonomer.

7. The coating composition of claim 6, wherein the macromonomer comprises at least 50% by weight of monomers selected from the group consisting of methacrylate, methacrylonitrile, methacrylamide and derivatives and mixtures therewith a weight average molecular weight of 500 to 10000 and is prepared by cobalt catalytic chain transfer polymerization.

8. The coating composition of claim 7, wherein the stabilizing copolymer comprises a AB block copolymer having a hydrophilic macromonomer as the A block and a hydrophobic copolymer as the B block.

9. The coating composition of claim 7, wherein the stabilizing polymer comprises a graft copolymer having a hydrophobic backbone and at least one hydrophobic macromonomer attached at a terminal end to the backbone.

10. The coating composition of claim 7, wherein the stabilizing copolymer comprises 2–15% by weight of the emulsion.

11. The coating composition of claim 6, wherein said composition further comprises at least one additive selected from the group consisting of cross-linking agents, pigments, antioxidants, flow modifiers, UV stabilizers, rheology control agents and film forming binders.

12. The coating composition of claim 6, wherein the acid value of the emulsion is less than 32.

* * * * *